United States Patent [19]

Mercer et al.

[11] 4,023,475

[45] May 17, 1977

[54] DOUGH LAMINATORS

[75] Inventors: Michael John Mercer, Newton-le-Willows; Stanley William Crispe, Huyton, both of England

[73] Assignee: Simon Vacars Limited, England

[22] Filed: Nov. 14, 1975

[21] Appl. No.: 632,008

[30] Foreign Application Priority Data

Dec. 7, 1974 United Kingdom ............ 53042/74

[52] U.S. Cl. .............................. 99/450.1; 99/450.2
[51] Int. Cl.² .......................................... A21C 9/08
[58] Field of Search .......... 99/450.1, 450.2, 450.4, 99/443; 156/459; 198/84, 127 R; 226/117, 124, 158; 425/200, 289

[56] References Cited

UNITED STATES PATENTS

| | | | |
|---|---|---|---|
| 2,627,822 | 2/1953 | Hubbard | 99/450.1 |
| 3,804,637 | 4/1974 | Rejsa | 99/450.1 |

Primary Examiner—Harvey C. Hornsby
Assistant Examiner—Arthur O. Henderson
Attorney, Agent, or Firm—Norris & Bateman

[57] ABSTRACT

A device for forming a laminate of, for example, dough sheets, comprising an input conveyor and an output conveyor for the sheets, there being a transfer conveyor between said input and output conveyors, which comprises a series of groups of rollers adapted to be advanced bodily across the output conveyor whilst a sheet is being fed onto the rollers of a group and the rollers being capable of rotation to discharge a sheet therefrom onto the output conveyor, there being spaces between the groups of rollers, through which the sheets are discharged, the whole operation being continuous such that a laminate of sheets is formed on the output conveyor which is preferably advanced such that the sheets are laid thereon in overlapping relationship.

16 Claims, 5 Drawing Figures

DOUGH LAMINATORS

This invention concerns a device for forming a laminate of, for example, dough sheets.

In the manufacture of products such as cracker biscuits it is essential to produce a laminate of dough sheets which is passed through one or more pairs of gauge rolls to determine its final thickness. In order to ensure a uniform thickness it is preferable to form the laminate from discrete sheets of dough rather than a continuous folded sheet where the edges tend to assume excessive thickness and density.

Thus according to the present invention, there is provided a device for forming a laminate of, for example, dough sheets, comprising sheet delivery means, and sheet receiving means, a transfer conveyor for receiving sheets successively from said sheet delivery means and movable to carry same over said sheet receiving means and having a driven conveying surface for discharging said sheets successively onto said sheet receiving means, first drive means for moving said transfer conveyor bodily over said sheet receiving means and second drive means for simultaneously driving the conveying surface of said transfer conveyor to discharge a sheet from said surface onto said sheet receiving means.

Embodiments of the invention will now be described, by way of example only, with reference to the accompanying drawings in which.

Figure 1:
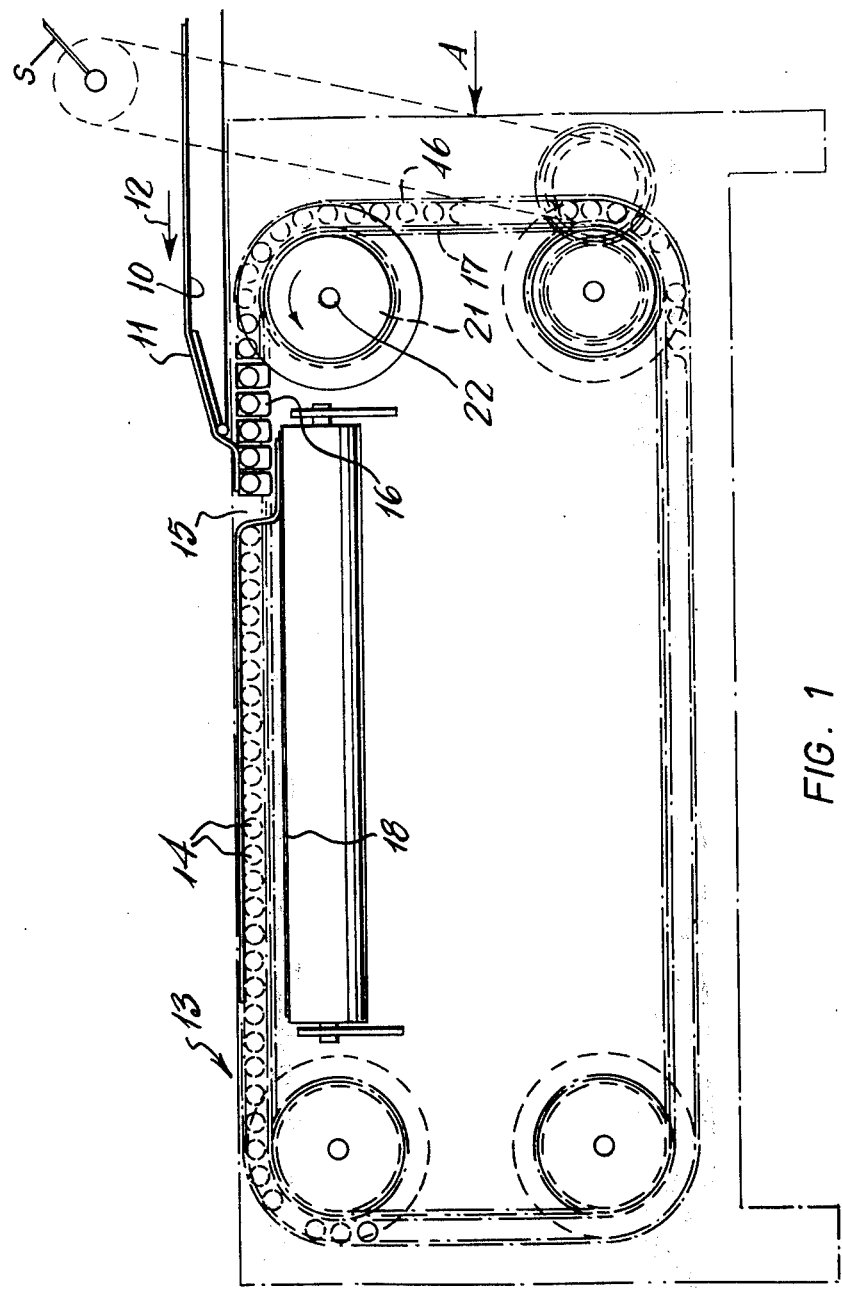
FIG. 1 is a schematic side elevation of a device made in accordance with the invention.

Referring now to the drawings, the device includes a sheet delivery means comprising an input conveyor 10 arranged to transfer the sheets 11 of dough in the direction of arrow 12 onto a transfer conveyor generally indicated at 13 and comprising an endless series of groups of beds of rollers 14. Between the groups of each adjacent pair there is provided a space 15 approximately equivalent in width to the space normally occupied by one roller 14. Each roller 14 is rotatably supported in a block 16 at each end and thereof and the blocks 16 are connected together by a first drive means comprising a pair of chains 17 so that the groups of rollers together form an endless conveying band.

Figure 2:
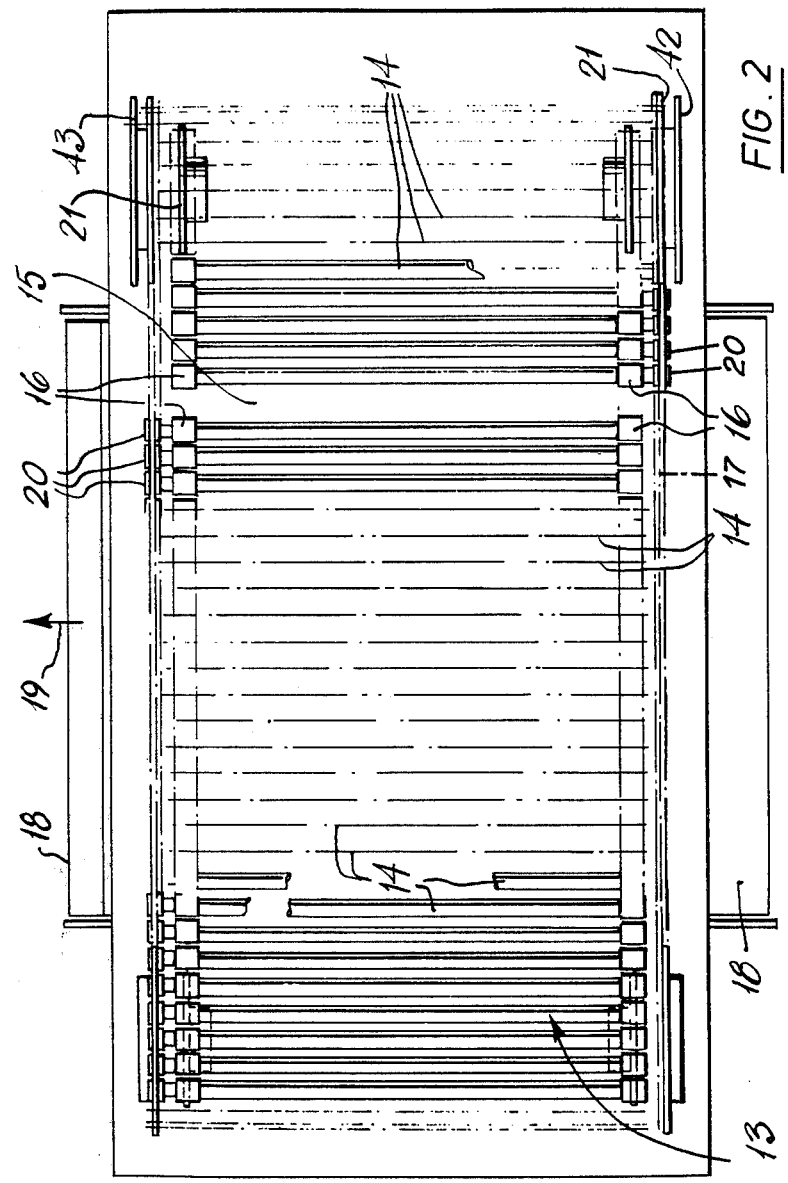
FIG. 2 is a plan view thereof with parts removed for clear illustration.

A sheet receiving means comprising an output conveyor 18 is provided below the conveying run of the transfer conveyor 13 and is arranged to travel in a direction transverse thereto. The output conveyor 18 is in the form of an endless belt which is driven in the direction of arrow 19. Mounted at one end of each roller is sprocket 20, and the sprockets 20 of consecutive groups of rollers 14 are provided at opposite ends thereof as can be seen from FIG. 2.

Figure 3:
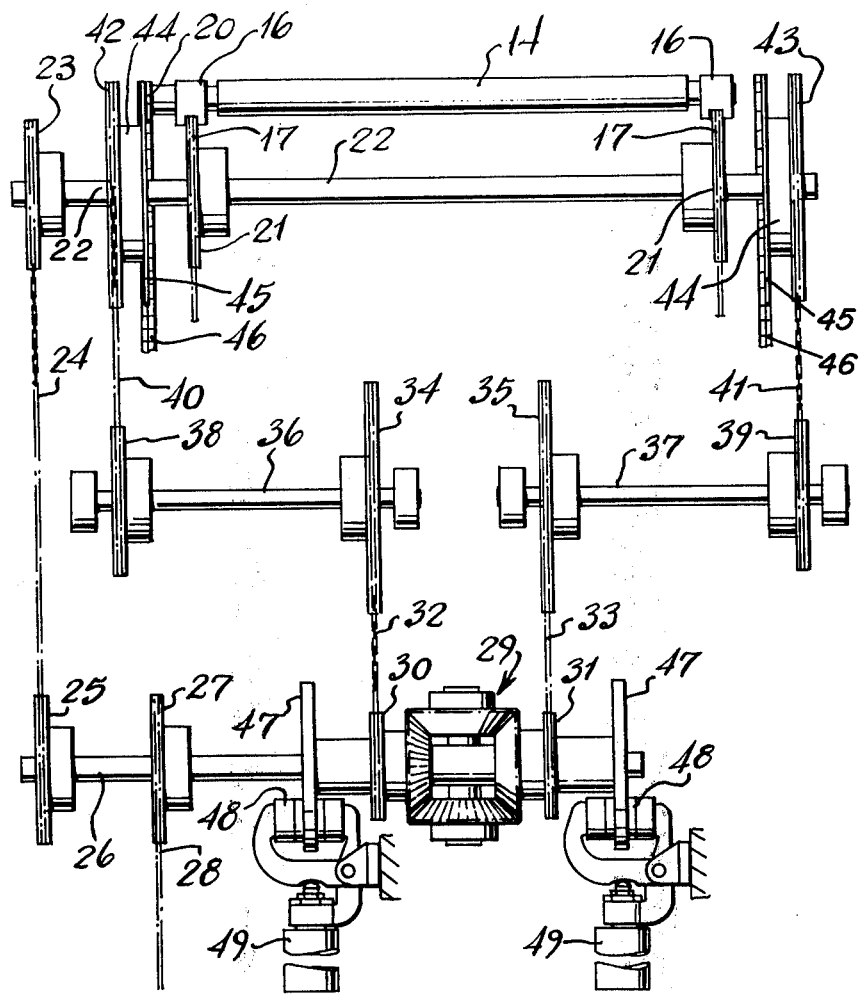
FIG. 3 is an end elevation taken in the direction of arrow A in FIG. 1, with parts removed for clear illustration.

As can be seen from FIGS. 1 and 3, the chains 17 for driving the transfer conveyor 13 extend around a number of sprockets 21 keyed to shafts 22 respectively. One such shaft 22 is driven by a system including a sprocket 23, chain 24, sprocket 25, shaft 26, sprocket 27 and chain 28, from a main machine drive motor (not shown).

Second drive means for selectively driving the sprockets 20 and rollers 14 is provided in so far as the drive shaft 26 is also transmitted to a differential gear 29 which drives a pair of output sprockets 30 and 31 which, via respective chains 32 and 33, drive sprockets 34 and 35 keyed to shafts 36 and 37. Mounted respectively on shafts 36 and 37 are a pair of further sprockets 38 and 39 which, via chains 40 and 41, drive a pair of sprockets 42, 43 which are freely mounted on the driven shaft 22. Each of sprockets 42 and 43 carries a hub 44 to which is attached a further sprocket 45. There are two sets each of four sprockets 45 mounted on shafts 22, and each set wrapped by one pair of duplex chains 46. The inner chain portion of each duplex chain also wraps the sprockets 20 of two alternate groups of rollers 14.

Axially connected to each output sprocket 30, 31 of the differential gear 29 is a disc 47, and each disc 47 forming part of a disc brake 48. Each brake 48 is capable of being actuated by a pneumatic cylinder 49 operated by a solenoid valve, the valves being actuated in sequence by means of a cam and a pair of micro switches, the cam being driven from the main machine drive motor.

A rotary cut off knife S is provided above the input conveyor 10 to cut predetermined lengths from a continuous sheet of dough thereon, and one or more pairs of gauge rolls (not shown) are provided upstream of the knife to determine the thickness of the dough.

In use therefore, the chains 17 drive the transfer conveyor 13 continuously and the disc brakes 48 are actuated alternately such that, through the associated driving connections, the duplex chains 46 are driven alternately from the differential gear 29.

With the apparatus in the operating condition illustrated in FIG. 1, the drive to the duplex chain 46 at the right hand side of FIG. 3, has been arrested so that as the chains 17 continue to advance the groups of rollers 14, the arrested duplex chain 46 serves as a rack engaged by the sprockets 20 of the group of rollers then positioned above the output conveyor 18, such that the rollers thereof rotate in a clockwise, or reverse, direction (in FIG. 1). As the outside diameter of the rollers is equal to the pitch circle diameter of the sprockets 20, the clockwise conveying speed of the rollers is equal and opposite to that of the chains 17, so that the dough sheet is deposited rearwardly onto the output conveyor through the adjacent space 15 as the chains 17 continue to advance. Whilst the dough sheet is being dispensed in this manner the next consecutive dough sheet is being deposited onto the rollers of the next consecutive group of rollers of the transfer conveyor 13, as this group moves across the ouput conveyor. As soon as the group carrying the next consecutive dough sheet has traversed the output conveyor, and the previous sheet has been transferred thereto, the disc brakes 48 are reversed to that the duplex chain 46 previously arrested commences to drive in syncronism with the chains 17 whilst the other chain 46 is arrested. As can be seen from FIG. 2, the sprockets 20 on the consecutive group of rollers 14, are provided at the opposite ends thereof such that these rollers are caused to rotate in a clockwise direction in FIG. 1, now to dispense the next dough sheet in a similar manner onto the output conveyor 18. It will be appreciated that this action is continuous and that during operation the output conveyor 18 is driven slowly in the direction of the arrow 19 so that the dough sheets are deposited onto the latter in overlapping relationship, the degree of overlap being determined by the relative speeds of the transfer conveyor and the output conveyor thus to determine the laminar structure of the dough sheets superimposed on the output conveyor.

To facilitate the transfer of a dough sheet onto the output conveyor, each sheet is laid onto the rollers 14 such that the trailing end of the sheet leaving the input conveyor is allowed to overhang into the adjacent space 15.

Figure 4:
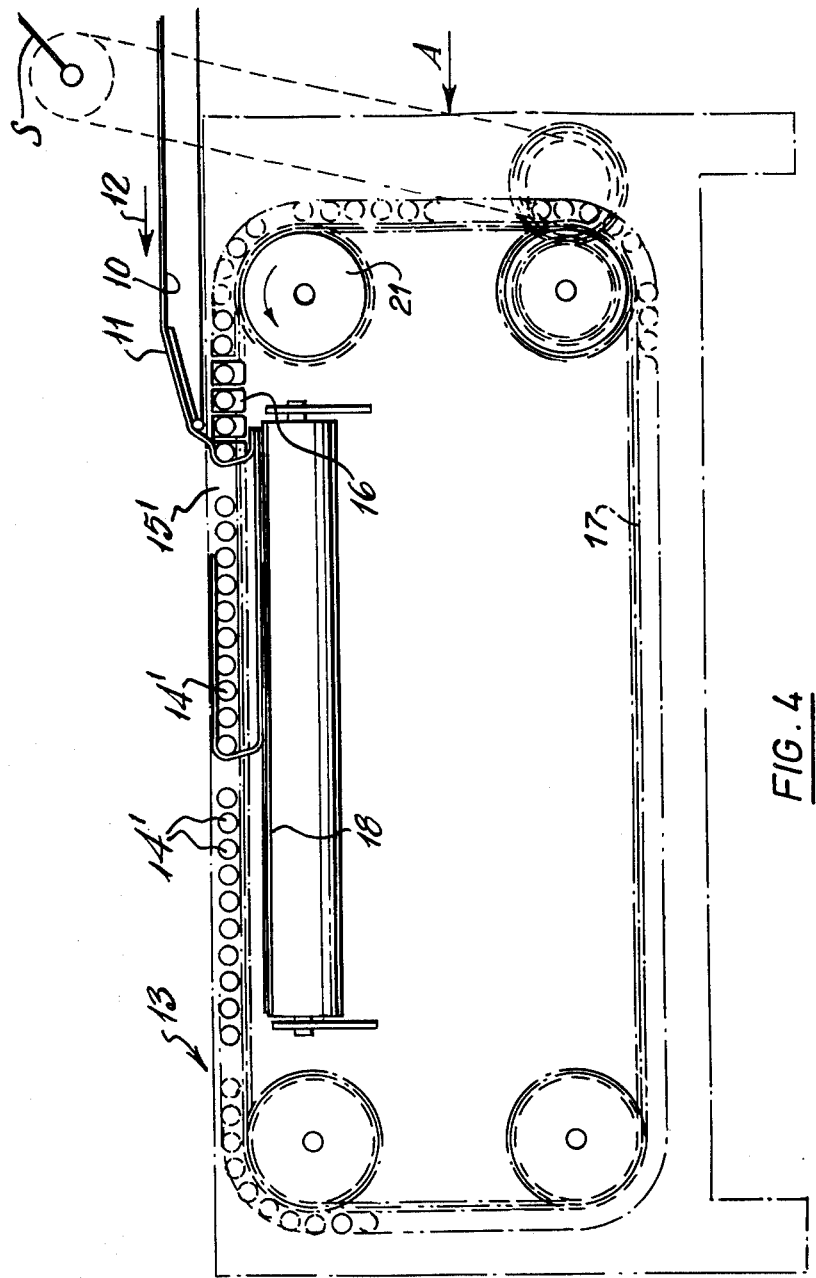
FIG. 4 is a side elevation of a second embodiment.
Figure 5:
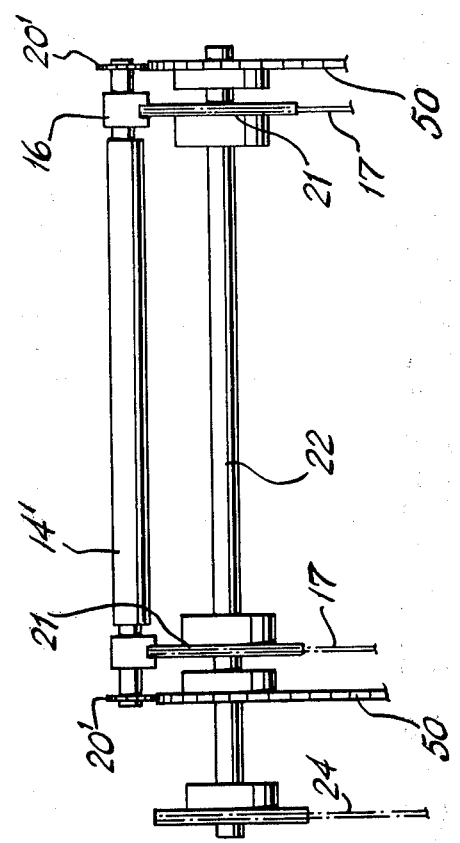
FIG. 5 is an end elevation of the second embodiment.

Referring now to FIGS. 4 and 5 wherein like parts carry like reference numerals, a second embodiment of the invention is illustrated wherein the transfer conveyor 13 again comprises a series of groups or beds or rollers 14' but in this case the number of rollers in each group is less than the embodiment illustrated in FIG. 1. Also, in this embodiment, the chains 17 are driven via shafts 22, directly from a sprocket 23' and chain 24'.

Mounted on each end of each roller 14' is a sprocket 20' and in this case the duplex chains are replaced by single chains 50 which extend around the run of the conveyor 13. As the chains 50 are held stationary in this embodiment, they serve continuously as a pair of racks so that the sprockets 20', by engagement with the outer side of the chains 50, cause the rollers 14' to rotate in an anti-clockwise direction in FIG. 4.

The outside diameter of the rollers 14' in relation to the pitch circle diameter of the sprockets 20' is selected such that the speed of the input conveyor 10 in this case is equal to the sum of the peripheral speed of the rollers 14' and speed at which they are advanced by the chains 17. In this way therefore each dough sheet leaving the input conveyor 10 is deposited directly through an adjacent gap 15' onto the conveyor 18, and as the next following group of rollers advances across the conveyor 18 with its rollers rotating, so the dough sheet is rolled out onto the conveyor in an upturned condition as can be seen from FIG. 4. In this embodiment the necessity for a differential gear and brake assembly is obviated as the chains 50 always remain stationary, the only drive being to the chains 17 driving the groups of rollers.

It is not intended to limit the invention to the above examples only, many variations, such as might readily occur to one skilled in the art, being possible without departing from the scope of the invention as defined by the appended claims.

For example, the system of FIG. 3., comprisng the differential gear 29 and disc brakes 48 can be replaced by a pair of drive motors arranged independently and selectively to drive the sprockets carrying the duplex chains 46.

Furthermore, it may be preferable, particularly in the embodiment of FIG. 1, to cause the conveyor 18 to be indexed forwards after a dough sheet has been completely laid thereon rather than being continuously in motion. In this way any tendency for the sheets to be laid on the conveyor askew is avoided. However, when the device is operating at full speed it may be difficult to accelerate and decelerate the conveyor 18 rapidly enough to make this possible.

What is claimed is:

1. A device for forming a laminate of, for example, dough sheets, comprising sheet receiving means upon which separate sheets of dough are to be deposited to form said laminate, sheet delivery means for supplying said dough sheets thereto, and a transfer conveyor movable to collect said sheets successively from said delivery means and to transfer same onto said receiving means, said transfer conveyor comprising an endless series of spaced conveying devices movable successively over said receiving means to carry individual sheets from said delivery means and to deposit same onto said receiving means, there being first drive means for advancing said series continuously in one direction to collect and carry said dough sheets, and second drive means for additionally driving the conveying surface of each device of said series to discharge a dough sheet therefrom onto said receiving means.

2. A device according to claim 1, wherein said sheet delivery means comprises an input conveyor, said transfer conveyor being driven past the output end thereof, and said sheet receiving means comprises an output conveyor disposed below said transfer conveyor and driven in a direction transverse to the direction of travel of said transfer conveyor.

3. A device according to claim 1, wherein said spaced conveying devices comprise an endless series of groups of parallel rollers, there being spaces between consecutive groups.

4. A device according to claim 3, wherein each said space is substantially equal to the space normally occupied by one roller.

5. A device according to claim 3, wherein each said roller is rotatably supported at each end thereof in a member drivingly attached to a continuous drive chain constituting said first drive means, whereby each roller is driven bodily in a conveying direction.

6. A device according to claim 3, wherein said second drive means comprises a pair of drive members drivingly connected to alternate groups of rollers in said series, and driven in the conveying direction therewith, means being provided for selectively arresting the motion of each said member thereby to serve as a rack to cause the rollers of a group to rotate during forwards movement of the group, in a reverse direction.

7. A device according to claim 6, wherein said drive members are driven from the output shafts respectively of a differential gear, said arresting means comprising a brake arranged to act selectively on said shafts.

8. A device according to claim 1, wherein said second drive means comprises a pair of endless chains adapted to engage the teeth of sprockets mounted at both sides of said conveying devices, means being provided for holding and chains stationary such that as said transfer conveyor is driven bodily over said sheet receiving means, the sprockets engage said chains as a rack and are thus rotated.

9. A device according to claim 1, wherein said second drive means is adapted to drive the conveying surfaces of each said device, when carrying a sheet thereon, in a reverse direction thus to discharge the sheet rearwardly as the device advances forwardly.

10. A device according to claim 1, wherein said second drive means is adapted to drive the conveying surface of each said device, in a forwards direction thus to discharge a sheet from said surface forwardly as the device advances forwardly.

11. A device according to claim 10, wherein the speed of delivery of said sheet delivery means is equal to the sum of the speed of forwards movement of said device and the speed of the conveying surface thereof.

12. A device for forming a laminate of, for example, dough sheets, comprising sheet delivery means, and sheet receiving means, a transfer conveyor for receiving sheets successively from said sheet delivery means and movable to carry same over said sheet receiving means and having a driven conveying surface for discharging said sheets successively onto said sheet receiving means, said transfer conveyor comprising an endless series of groups of parallel rollers, there being a space between the groups of each consecutive pair, first drive means for moving said transfer conveyor bodily over said sheet receiving means and second drive means for simultaneously driving the conveying surface of said transfer conveyor to discharge a sheet from said surface onto said sheet receiving means.

13. A device according to claim 12, wherein said space is approximately equal to the space normally occupied by one roller.

14. A device according to claim 12, wherein each said roller is rotatably supported at each end thereof in a member drivingly attached to a continuous drive chain constituting said first drive means, whereby each roller is driven bodily in a conveying direction.

15. A device according to claim 12, wherein said second drive means comprises a pair of drive members drivingly connected to alternate groups of rollers in said series, and driven in the conveying direction therewith, means being provided for selectively arresting the motion of each said member thereby to serve as a rack to cause the rollers of a group to rotate during forwards movement of the group, in a reverse direction.

16. A device according to claim 15, wherein said drive members are driven from the output shafts respectively of a differential gear, said arresting means comprising a brake arranged to act selectively on said shafts.

* * * * *

UNITED STATES PATENT OFFICE
CERTIFICATE OF CORRECTION

Patent No. 4,023,475          Dated May 17, 1977

Inventor(s) Michael John Mercer et al

It is certified that error appears in the above-identified patent and that said Letters Patent are hereby corrected as shown below:

The Assignee of the above-identified patent should read:

--Simon Vicars Limited--

Signed and Sealed this

Sixth Day of September 1977

[SEAL]

Attest:

RUTH C. MASON
*Attesting Officer*

LUTRELLE F. PARKER
*Acting Commissioner of Patents and Trademarks*